United States Patent

Duncan

[15] 3,639,038

[45] Feb. 1, 1972

[54] OPTICAL-ELECTROMECHANICAL APPARATUS FOR GENERATING AND COLLAPSING CHIRP PULSES

[72] Inventor: Robert Stanwood Duncan, Winston-Salem, N.C.

[73] Assignee: Bell Telephone Laboratories, Incorporated, Murray Hill, N.J.

[22] Filed: Aug. 21, 1970

[21] Appl. No.: 66,021

[52] U.S. Cl. ..........350/161, 250/230

[51] Int. Cl. ..........G02f 1/34

[58] Field of Search ..........350/161, 285; 250/199, 230

[56] References Cited

UNITED STATES PATENTS 1,977,027 10/1934 Vaughan..........350/285

3,436,546 4/1969 Derderian et al..........250/199

*Primary Examiner*—Ronald L. Wibert

*Assistant Examiner*—Jeff Rothenberg

*Attorney*—R. J. Guenther and William L. Keefauver

[57] ABSTRACT

A beam of collimated light is reflected from a torsionally pulsed acoustic delay medium. Successive portions of the light reflected from the medium pass through a nonuniform transmission grating to a photomultiplier device. The device output comprises either a chirp pulse or a collapsed chirp pulse depending on the torsional pulse applied to the medium and the orientation of the grating.

6 Claims, 3 Drawing Figures

PATENTED FEB 1 1972 3,639,038

INVENTOR
R. S. DUNCAN
BY H. L. Logan
ATTORNEY

OPTICAL-ELECTROMECHANICAL APPARATUS FOR GENERATING AND COLLAPSING CHIRP PULSES

BACKGROUND OF THE INVENTION

1. Field of the Invention

This invention relates to apparatus for generating and collapsing bursts of frequency-modulated waves.

2. Description of the Prior Art

U.S. Pat. No. 2,678,997, issued to S. Darlington on May 18, 1954, and the article entitled "The Theory and Design of Chirp Radars" by J. R. Klaudner et al. in the July 1960 issue of the *Bell System Technical Journal* describe the use of frequency-modulated, or so-called "chirp," pulses for communication systems. Such systems maintain information bandwidth while increasing transmitted power by transmitting longer bursts of energy.

As appreciated by those skilled in the art, chirp systems require generating and collapsing bursts of frequency modulated waves. One prior art technique for accomplishing these functions uses an ultrasonic light modulator (ULM) which responds to a carrier wave to modulate at least a portion of a collimated light beam entering the ULM at a right angle to the direction of travel of the modulating waves induced in the ULM. The modulated portion of the light beam sweeps across a nonuniform transmission grating with the output of the grating being detected by a photosensitive device. A chirp output appears in response to a constant frequency carrier pulse while a collapsed chirp pulse appears in response to a chirped carrier pulse.

The light modulating phenomenon in the above-described optical-electromechanical technique relies upon refraction changes produced by travelling stresses induced in the ULM material. Birefringence and other actions occur, however, which result in modulating only a relatively small portion of the light beam energy. This relatively small modulating efficiency results in an output having a signal-to-noise ratio which is inadequate in some applications.

SUMMARY OF THE INVENTION

An object of the present invention is to generate and/or collapse chirp pulses through the use of an optical-electromechanical technique which has a signal-to-noise ratio superior to that realizable when practicing the above-described technique.

A principal feature of the present invention is a relatively efficient optical-electromechanical interacting mechanism in the form of a torsional fiber delay member having an external plane surface which reflects a collimated light beam. In particular, a beam of collimated light is reflected from a flat surface on an elongated acoustic delay member. When the member is subjected to a very short or spikelike torsional pulse, short axial sections of the member are successively tilted so that successive portions of the light reflected from the member pass through a nonuniform transmission grating. A detector receives the light passed by the grating and produces a chirp output in response thereto. When the grating is reversed and a dispersed torsional pulse is applied to the member, a collapsed pulse is detected.

Other objects and features of the invention will become apparent from a study of the following detailed description of a specific embodiment.

DETAILED DESCRIPTION

Figure 1:
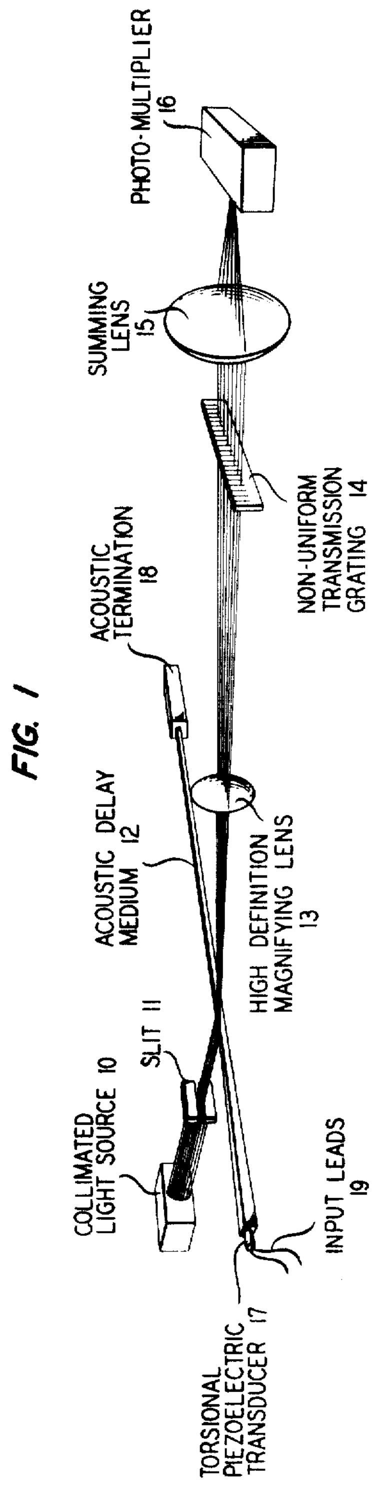
FIG. 1 and 2 show two views of an embodiment of the invention.
Figure 2:
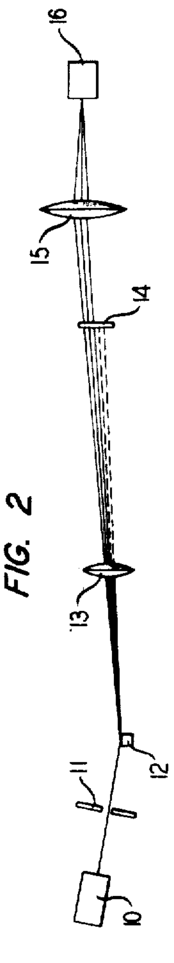

The disclosed embodiment shown in FIG. 1 and 2 includes a collimated light source 10 which can be a continuous laser source. Source 10 projects a beam of light some of which passes through a slit 11 and reflects off the upper flat surface of an acoustic delay medium 12. A high definition magnifying lens 13 images the light from the illuminated surface of medium 12 on the lower opaque portion of a transmission grating 14. When medium 12 is subjected to a torsional wave in a manner to be discussed, some of the reflected light is deflected to sweep across the upper portion of grating 14. The upper portion of grating 14 has alternating transparent and opaque sections so that the total grating has a comblike appearance. Furthermore, the widths of the transparent and opaque sections get progressively larger when travelling in the direction of the sweeping beam. A summing lens 15 focuses light that passes through grating 14 on the light-receiving surface of a photomultiplier 16.

Acoustic delay medium 12 has a torsional piezoelectric transducer 17 connected to one of its extremities and an acoustic termination 18 connected to its other extremity. Transducer 17 has a pair of input leads 19 for receiving electrical inputs which in turn cause transducer 17 to introduce torsional pulses into medium 12. The cross section on medium 12 preferably has a monotonically decreasing taper between transducer 17 and its reflecting surface to produce a transforming action which accommodates for energy loss experienced by torsional pulses passing down medium 12. Furthermore, medium 12 efficiently transmits substantially only symmetrical torsional waves. Termination 18 absorbs substantially all torsional pulses so that reflections are suppressed.

Figure 3:
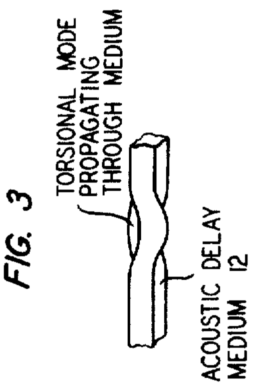
FIG. 3 shows an enlarged and exaggerated view of a segment of the acoustic delay medium of the disclosed embodiment.

When a very short pulse of carrier waves is applied to transducer 17, an ultrasonic torsional pulse is initiated at that end of medium 12. This pulse propagates down medium 12 at the shear wave velocity. As the pulse traverses medium 12, short axial regions are successively tilted or rotated around the axis as shown in an exaggerated form in FIG. 3. Such tilting action changes the angle of incidence (and reflection) of the light beam on medium 12 and results in local vertical displacements of the beam at grating 14. A short ultrasonic torsional pulse in medium 12 therefore causes a spot of light to be deflected up onto the upper portion of grating 14. Furthermore, this spot traverses across grating 14 in a horizontal manner at the shear wave velocity of medium 12 multiplied by the magnification ratio of magnifying lens 13. Because this spot is scanning increasingly spaced transparent sections of grating 14, a frequency-modulated light appears at the output side of grating 14. When the transparent and opaque sections in the upper portion of grating 14 increase in width in a linear fashion, a linear frequency modulated light pulse is focused on photomultiplier 16 by summing lens 15.

A chirp pulse may be collapsed by the disclosed embodiment by reversing grating 14 end-for-end and applying the chirp pulse to transducer 17. In this case, a collapsed pulse is detected by photomultiplier 16.

What is claimed is:

1. A combination comprising an acoustic delay member which efficiently transmits substantially only symmetrical torsional waves induced therein and, furthermore, which has a substantially optically flat reflective surface area, means for directing a beam of collimated light onto said surface area of said member for reflection therefrom, a transducer affixed to said member to induce torsional waves therein to deflect successive portions of said light reflected by said member, a nonuniform transmission grating positioned to pass therethrough only a portion of each of said successive portions of deflected light reflected by said member, and detecting means for receiving light passed by said grating.

2. A combination in accordance with claim 1 which further comprises a termination affixed to said member to suppress echo torsional waves in said member.

3. A combination comprising an acoustic delay member which efficiently transmits substantially only symmetrical torsional waves induced therein and, furthermore, which has a substantially optically flat reflective surface area, means for directing a beam of collimated light onto said surface area of said member for reflection therefrom, a transducer affixed to said member to induce torsional waves therein to deflect successive portions of said light reflected by said member, a nonuniform light transmission grating positioned so that said light reflected by said member does not pass through said grating when said member is not transmitting torsional waves and, furthermore, so that at least a portion of each of said portions of light deflected when said member is transmitting torsional waves passes through said grating, and detecting means for receiving light passed by said grating.

4. A combination in accordance with claim 3 which further comprises a termination affixed to said member to suppress echo torsional waves in said member.

5. A combination comprising an elongated acoustic delay member capable of efficiently transmitting substantially only symmetrical torsional waves and having a monotonically decreasing taper from a first extremity to at least a substantially optically flat reflection surface area located between said first extremity and the other extremity of said member, means for producing a beam of collimated light which is reflected from said surface area of said member, a torsion piezoelectric transducer affixed to said first extremity of said member to induce torsional waves therein when said transducer is energized to deflect successive portions of said light reflected by said member, a nonuniform light transmission grating positioned to be opaque to said light reflected by said member when said member is not subjected to torsional waves and to pass at least a portion of each of said portions of deflected light produced when said member is subjected to torsional waves, and detecting means for receiving light passed by said grating.

6. A combination in accordance with claim 5 in which a nonreflective termination is connected to said other extremity of said member to suppress echo torsional waves in said member.

* * * * *